Patented Feb. 14, 1939

2,146,870

UNITED STATES PATENT OFFICE 2,146,870

UPHOLSTERY STUFFING TREATMENT AND PRODUCT

Edward Oldroyd Whiteley, San Francisco, Calif.

No Drawing. Application July 26, 1937, Serial No. 155,833

10 Claims. (Cl. 91—68)

This invention relates to upholstery stuffing materials such as used for stuffing or filling of upholstery cushions, chair padding, automobile seats, theater seats, bed pillows, and similar purposes, and the invention has for its object the improvement in the quality of the stuffing materials used whether the same be of cotton wool or batting, animal wool, mixtures of cotton and wool, feathers, cellulose fibers, sisal, sugar cane fibers, redwood or other bark fibers, or any other vegetable or animal fibers, or even spun glass fibers, or glass wool.

A particular object of the invention is to provide a treatment for such stuffing fibers which will increase their resiliency and life, minimize their packing tendency while at the same time increase their bulking propensities and reduce their weight per unit volume.

Other advantages of the invention will appear in the following description.

Briefly stated, the invention comprises a special treatment of the fibers with a rubber solution or mixture, together with certain chemical and mechanical after treatment, whereby a rubberized fiber results having improved and different characteristics than those heretofore obtainable in the same class of fiber.

I am aware that heretofore it has been purposed by various inventors to treat various fibers and fabrics to rubber and/or latex in solution for the purpose of strengthening and/or waterproofing the same, and rubberized felting, moulded fibers, compressed fibers, or padding fibers treated with rubber to form attached fibers are not new, but the advantages of my invention are based on the fact that the rubberized fibers resulting from my treatment are not compressed, nor attached together by rubber or other bonds at points of crossing but are open and fluffy, loose, and free from attachment with one another, yet will not materially slip one upon the other to become packed. Besides, they are very light as they carry but a minimum quantity of rubber or rubber mixture on their exterior surfaces only, and may easily be re-treated or renewed if required after long usage and lapse of time.

My process, in its most complete expression, includes chemically treating the rubberized fibers so that their surfaces become slightly nodulated, wrinkled, or pitted, so that additional means is provided besides the high frictional nature of the rubberized surfaces to reduce surface slipping of the fibers with respect to each other when subject to repeated compression in use as in cushions. This feature is largely responsible for the greatly increased and maintained bulk of my treated fiber which runs as high as a third increase over the bulk of untreated fiber.

Briefly stated, my treatment of stuffing fibers, say for instance, cotton wool, comprises

*First.*—Preparing the cotton to receive a colloidal solution of rubber by passing the fiber into a heated chamber in which there is a circulation of steam vapor charged with about 1 in 10,000 parts of a 99% solution of acetic acid, or formaldehyde, or other coagulant. After a few moments exposure to this treatment the fiber is removed, and

*Second.*—The treated fiber is dipped into a colloidal solution of rubber or rubber latex which will, through the action of the slight amount of coagulant already on the fibers, rapidly coagulate on the surface of each fiber and completely cover it with a very light film of deposited rubber. The thickness of the film is under definite control, as it depends on the strength or time of pretreatment with the coagulant. This method of treatment deposits a film of coagulated rubber evenly upon each fiber, yet without coagulating main body of the dispersed rubber depositing solution itself, as the coagulating action is only exerted by the coagulant carried by each fiber upon the rubber solution immediately surrounding and in contact with each fiber only, and hence preserving the bulk of the solution for repeated applications to more fiber.

*Third.*—The solution of colloidal rubber used for coating the fibers preferably consists of an aqueous ammoniacal solution of vulcanized rubber latex, or rubber latex prepared by well known methods with suitable curing and vulcanizing compounds, or synthetic aqueous solutions of rubber, all of which may have a dry rubber content of from about 5 to 91.4 grams per 100 cubic centimeters, and with which is preferably incorporated solutions of glue, casein, gelatin or aqueous solutions of resin or synthetic resin, and including a small quantity of a solution of hypochlorite, or formaldehyde, to act as a deodorant and destroy the odor of putrefying protein particles of the latex, if same be used.

In preparing a solution of colloidal rubber for dipping or immersion of the fiber, it is found that the following preparation gives satisfactory results:

| | Parts |
|---|---|
| 30% rubber latex solution | 50 |
| 8% casein glue solution (in alkali) | 25 |
| 4% gelatin solution | 12½ |
| 1% resin solution (aqueous alkaline) | 12½ |

The above solution is to be thoroughly mixed and then passed through a homogenizing machine at a pressure which may go up to several thousand pounds per square inch, to form an irreversible colloidal emulsion of the rubber together with the other constituent parts of the mixture, and preventing the separation or settling out of the component solids of the solution, and to insure an even distribution on the fiber when dipping it.

In treating feathers by the process, a modification of the colloidal rubber solution is desirable, the objective being different, each feather being a separate unit of the mass, not entwined but lying one against the other in an irregular manner. In this case I wish to cause increased surface tension and slightly stiffen the mass to prevent a packing down or easy compression. A solution is therefore used, the elements of which more closely resemble those of the feathers. In making a dipping solution of this kind, viscose or cellulose xanthate may be included with the ingredients already mentioned.

*Fourth.*—After dipping any of the fiber or feathers in the colloidal rubber solution, the surplus solution is thrown off by whirling the fiber in a centrifugal extractor. It is found that a more uniform covering is given to the fiber than the method of squeezing dry or passing through rollers. The extractor is preferably made of stainless steel.

*Fifth.*—Before further treatment the surface film of colloidal rubber deposited on the fiber is set, but not fully dried, the operation being carefully timed, the surface film of rubber on each fiber is given a wrinkled or corrugated finished surface by passing through a solvent bath, or spray of benzene, carbon tetrachloride or other suitable media, or some of these may be made up into emulsions by mixing with water and soap.

This treatment swells the rubber film on the fiber and wrinkles it, thus changing the surface friction of the fibers. Alternately, this surface result may be produced by dusting the still wet film of rubber with fine common salt particles which cause a pitting of the surface film on the fiber causing a rough surface so that both these methods cause increased surface friction at points where the fibers cross so that the fibers brace each other in a self-supporting irregular structure. This nodulated surface result may also be obtained by drying the coated fiber rapidly, thereby causing a bubble surface pitting. The fiber is then dried out to slightly damp condition, if the last operation was wetting.

*Sixth.*—The still slightly damp fiber is now passed to a willowing or picking machine which is provided with a rotating drum covered with spikes, and enclosed to hold the fibers. In this machine the fibers are pulled apart or opened up into a fluffy mass until substantially dry, and it is this treatment which causes an increased bulk or volume which may be as high as 25% more than normally obtained in fibers not prepared in this way. The resultant fiber has great buoyancy and resistance to distortion and compression.

The willowing machine or picker may also be provided with a recirculating stream of blown hot dry air with a suitably protected exhaust to carry away moisture from the fiber to facilitate rapid drying, and during this period of drying the spikes of the machine engage the fiber continuously and prevent them becoming sealed together at the points of crossing of the fibers before the fiber is completely dried.

I find that feathers treated by my process are improved for commercial use, in that the quills do not readily pierce covering material and fabrics and escape onto furniture and clothing, nor do not extrude to irritate users. In preparing feathers for the rubber dipping process, they may first be wetted with vapors of diluted solutions of a hypochlorite, or hydrochloric acid, then dried before dipping in solution of rubber.

Heavier or coarser fibers such as sisal, hemp, or wood or bark fiber, may be willowed or picked or curled or teased to simulate horse hair fillings of higher price in the treatment of this process. Untreated, these fibers when used as filling for upholstery, tend to settle or break down into short fibers and create messy residue, but when such fiber is treated with colloidal rubber solutions it becomes stronger, its tensile strength increases and it becomes a tough fiber which does not break down easily and resists compression and distortion.

The value of stuffing fibers is greatly improved commercially by this method of treatment as it may be reclaimed and used over again, after washing and sterilizing, and when aged or impaired, may be reprocessed in accordance with the foregoing, having thereby an advantage over treated fibers which are attached to each other by their adhesive coatings at points of crossing of the fibers, as well as fibers which are sheeted or molded and which can only be reclaimed by expensive treatment.

My method of treating stuffing fibers produces a different result than prior processes. This high bulking, lighter fiber has a downy softness and fluffy volume, and will not pack down easily or form a heavy mass, but each fiber remains separate so that it is not laterally connected with its neighbor, so that while the fibers may slip freely and independently and relatively one to another when being handled by operators making the fiber into upholstery goods, or when being pulled apart by mechanical action of machinery in the same way as untreated fiber, yet owing to their mutual surface friction and nodulated surfaces, will not slip in normal use as upholstering stuffing. The free, though frictionally restricted, movement of each individual fiber in the treated material is an important development of this process.

Regarding glass fibers: Spun glass, glass wool or glass fiber untreated has no useful elasticity, but under compression or distortion is dead, and has no recovery. After treating with colloidal solutions of rubber its character changes, it assumes a springy character and makes a good recovery after compression. In applying my process to such material it has been found more advantageous to dip fibers of glass into a weak solution of hydrofluoric acid, or expose it to the fumes of the acid, to roughen the surface of the fibers to prepare them to hold or adsorb the colloidal rubber solution. Alternately the fiber may be prepared by heating to 260° F. and then dipping into a solution consisting of haemoglobin or red end of blood serum one per cent, or the glass fiber may be first heated, then dipped into a 2% solution of molasses, or other colloidal substratum. The fiber is then dried and fired at medium temperature to fix or bake the preparing solution to the fiber before dipping into the colloidal solution of rubber.

In my use of the word fiber or fibers, in my appended claims, these terms are to be understood as covering all the various types of fibers mentioned herein including feathers and spun glass, or any other type of fiber or loose material useful for stuffing upholstery, chair and other cushions, pillows, etc.

Having thus described my invention and some of the variations in product and manner of applying, what I claim is:

1. A dry loose mass of stuffing fiber in which the individual fibers are coated with a resilient colloidal film containing rubber, the surface of the film is roughened or nodulated, and the fibers are unattached at points of crossing.

2. The method of improving stuffing fibers which comprises coating the fibers with a resilient film containing rubber, and subjecting the coated fiber before the coating has become firmly set to a picking or willowing operation until the coating is dry to fluff up the coated fiber and prevent substantial adherence at points of crossing of the fibers.

3. The method of claim 2 in which the coating mixture contains latex, glue, casein, and a deodorant.

4. The method of claim 2 in which the rubber coating mixture is in aqueous suspension and passed through a homogenizer.

5. The method of improving stuffing fibers which comprises coating the fibers of a loose mass of the fiber exteriorly with a liquid containing rubber adapted to form a resilient film, treating the mass before the coating is fully dried to nodulate the coating to reduce surface slipping of the fibers, and providing against the cementing together of the fibers at points of crossing during the drying of the coating until a loose assemblage of the coated and nodulated dried fibers results.

6. The method of improving stuffing fibers which comprises coating the fibers of a loose mass of the fiber exteriorly with a liquid containing rubber adapted to form a resilient film, treating the mass before the coating has become firmly set to nodulate or roughen the coating to reduce surface slipping of the fibers, and subjecting the coated fiber during the drying of the coating to a picking operation to fluff up the coated fiber and prevent adherence at points of crossing of the fibers whereby a loose assemblage of the coated and dried fibers results.

7. The method of improving stuffing fibers which comprises coating the fibers of a loose mass of the fiber exteriorly with a liquid containing rubber adapted to form a resilient film, and treating the mass with salt for pitting the coating to reduce surface slipping of the fibers while providing against the cementing of the fibers together at points of crossing during the drying of the coating until a loose dry mass of the coated and pitted fibers results.

8. The method of improving stuffing fibers which comprises first treating the fibers with a coagulant for rubber, depositing a film containing rubber on the fibers from an aqueous liquid containing rubber, centrifuging off the surplus liquid, partially drying the coated fiber, and subjecting the fiber to a picking action until the coated fibers are dry to maintain the dried coated fibers free at points of crossing.

9. The method of improving stuffing fibers which comprises first treating the fibers to the action of vapor carrying a coagulant for rubber, depositing a film containing rubber on the fibers from aqueous liquid containing rubber, centrifuging off the surplus liquid, partially drying the coated fiber, and subjecting the fiber to a picking action until the coated fibers are dry to maintain the dried coated fibers free at points of crossing.

10. A dry loose mass of stuffing fiber in which the individual fibers are coated with a resilient collodial film and the fibers are unattached at points of crossing made substantially by the process of claim 2.

EDWARD OLDROYD WHITELEY.